United States Patent
Chiche et al.

(10) Patent No.: US 12,492,296 B2
(45) Date of Patent: Dec. 9, 2025

(54) METHOD FOR OBTAINING A PURIFIED DIESTER EFFLUENT BY DEPOLYMERISING A POLYESTER COMPRISING OPAQUE POLYETHYLENE TEREPHTHALATE

(71) Applicant: IFP Energies nouvelles, Rueil-Malmaison (FR)

(72) Inventors: David Chiche, Rueil-Malmaison (FR); Damien Leinekugel Le Cocq, Rueil-Malmaison (FR); Christine Bounie, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 781 days.

(21) Appl. No.: 17/786,101

(22) PCT Filed: Dec. 7, 2020

(86) PCT No.: PCT/EP2020/084851
§ 371 (c)(1),
(2) Date: Jun. 16, 2022

(87) PCT Pub. No.: WO2021/122096
PCT Pub. Date: Jun. 24, 2021

(65) Prior Publication Data
US 2023/0028123 A1     Jan. 26, 2023

(30) Foreign Application Priority Data
Dec. 19, 2019 (FR) .................................... 1914992

(51) Int. Cl.
*C08J 11/24* (2006.01)
*C07C 67/03* (2006.01)
*C07C 67/56* (2006.01)
*C02F 1/28* (2023.01)

(52) U.S. Cl.
CPC .............. *C08J 11/24* (2013.01); *C07C 67/03* (2013.01); *C07C 67/56* (2013.01); *C02F 1/285* (2013.01); *C08J 2367/02* (2013.01)

(58) Field of Classification Search
CPC .......... C08J 11/24; C07C 67/03; C07C 67/56; C07C 69/82; C02F 1/285
See application file for complete search history.

(56) References Cited

U.S. PATENT DOCUMENTS

| | | | |
|---|---|---|---|
| 4,502,957 A * | 3/1985 | Jehle ................... | C08G 85/002 210/690 |
| 6,642,350 B1 | 11/2003 | Asakawa et al. | |
| 10,544,276 B2 | 1/2020 | Charra et al. | |
| 2006/0074136 A1 | 4/2006 | Smith et al. | |
| 2015/0105532 A1 | 4/2015 | Allen et al. | |
| 2019/0161595 A1* | 5/2019 | Charra .................... | C07C 67/54 11/24 |

FOREIGN PATENT DOCUMENTS

| EP | 0080434 B1 | 4/1986 |
|---|---|---|
| WO | 2018007356 A1 | 1/2018 |

OTHER PUBLICATIONS

International Search Report PCT/EP2020/084851 dated Apr. 1, 2021 (pp. 1-2).

* cited by examiner

*Primary Examiner* — Yate' K Cutliff
(74) *Attorney, Agent, or Firm* — Miller, White, Zelano & Branigan, P.C.; Brion P. Heaney

(57) ABSTRACT

The present invention relates to a process for depolymerizing a polyester feedstock comprising opaque PET, which comprises: a) a conditioning step; b) a step of glycolysis, operated at between 180 and 400° C., a residence time of from 0.1 to 10 h in the presence of diol; c) a diol separation step, at a temperature of between 100 and 250° C., a pressure lower than that of step b) and producing a diol effluent and an effluent rich in monomers; d) a step of separating into a heavy impurities effluent and a prepurified monomers effluent, at a temperature of less than 250° C. and a pressure of less than 0.001 MPa and a residence time of less than 10 min; e) a step of decolourizing the prepurified monomers effluent, by adsorption of a mixture comprising between 20% and 90% by weight of the prepurified monomers effluent and a solvent, at a temperature of between 100 and 200° C., a pressure of between 0.1 and 1.0 MPa and in the presence of at least one adsorbent.

23 Claims, No Drawings

METHOD FOR OBTAINING A PURIFIED DIESTER EFFLUENT BY DEPOLYMERISING A POLYESTER COMPRISING OPAQUE POLYETHYLENE TEREPHTHALATE

TECHNICAL FIELD

The invention relates to a process of depolymerization by glycolysis of a polyester, more particularly the polyester terephthalate, comprising coloured and/or opaque and/or multilayer polyethylene terephthalate (PET), for recycling said polyester in a polymerization unit. The invention relates more particularly to a process for depolymerizing by glycolysis a polyester feedstock comprising at least coloured and/or opaque PET, with a step of optimized final purification of the diester effluent obtained.

PRIOR ART

The chemical recycling of polyester, more particularly of polyethylene terephthalate (PET), has been a subject of numerous studies aimed at breaking down the polyester, recovered in the form of waste, into monomers which will be able to be used again as feedstock for a polymerization process.

Numerous polyesters result from circuits for collecting and sorting materials. In particular, polyester, especially PET, can originate from the collection of bottles, trays, films, resins and/or fibres composed of polyester (such as, for example, textile fibres, tyre fibres). The polyester resulting from collecting and sorting industries is referred to as polyester to be recycled. PET to be recycled can be classified into four main categories:

clear PET, predominantly composed of colourless transparent PET (generally at least 60% by weight) and azure coloured transparent PET, which does not contain pigments and can be used in mechanical recycling processes;

dark or coloured (green, red, etc.) PET, which can generally contain up to 0.1% by weight of dyes or pigments but remains transparent or translucent;

opaque PET, which contains a significant amount of pigments at contents typically varying between 0.25% and 5.0% by weight in order to opacify the polymer. Opaque PET is increasingly being used, for example in the manufacture of food containers, such as milk bottles, in the composition of cosmetic, plant-protection or dye bottles;

multilayer PET, which comprises layers of polymers other than PET or a layer of recycled PET between layers of virgin PET (that is to say, PET which has not undergone recycling), or a film of aluminium, for example. Multilayer PET is used, after thermoforming, to produce packaging such as trays.

The collecting divisions, which supply the recycling divisions, are structured differently depending on the country. They are changing so as to maximize the amount of plastic recycled from waste as a function of the nature and of the amount of the streams and of the sorting technologies. The industry for recycling these streams generally consists of a first step of conditioning in the form of flakes during which bales of raw packaging are washed, purified and sorted, ground and then again purified and sorted to produce a stream of flakes generally containing less than 1% by weight of "macroscopic" impurities (glass, metals, other plastics, wood, paper, cardboard, inorganic elements), preferentially less than 0.2% of "macroscopic" impurities and more preferentially still less than 0.05%.

Clear PET flakes can subsequently undergo a step of extrusion-filtration which makes it possible to produce extrudates which can subsequently be reused as a mixture with virgin PET to produce new products (bottles, fibres, films). A step of solid state polymerization under vacuum (known under the acronym SSP) is necessary for food uses. This type of recycling is known as mechanical recycling.

Dark (or coloured) PET flakes can also be recycled mechanically. However, the colouration of the extrudates formed from the coloured streams limits the uses: dark PET is generally used to produce packaging straps or fibres. The outlets are thus more limited in comparison with those of clear PET.

The presence of opaque PET containing pigments at high contents, in PET to be recycled, presents problems to recyclers as opaque PET detrimentally affects the mechanical properties of recycled PET. Opaque PET is currently collected with coloured PET and is found in the coloured PET stream. In view of the development of the uses for opaque PET, the contents of opaque PET in the stream of coloured PET to be recycled are currently between 5-20% by weight and are tending to increase further. In a few years' time, it will be possible to achieve contents of opaque PET in the coloured PET stream of greater than 20-30% by weight. In point of fact, it has been shown that, above 10-15% of opaque PET in the coloured PET streams, the mechanical properties of the recycled PET are detrimentally affected (cf. *Impact du developpement du PET opaque blanc sur le recyclage des emballages en PET* [Impact of the growth of white opaque PET on the recycling of PET packaging], preliminary report of COTREP of May 12, 2013) and prevent recycling in the form of fibres, the main outlet of the industry for coloured PET.

Dyes are natural or synthetic substances which are soluble, in particular in the polyester material, and are used to colour the material into which they are introduced. The dyes generally used have different natures and often contain heteroatoms of 0 and N type, and conjugated unsaturations, such as, for example, quinone, methine or azo functions, or molecules such as pyrazolone and quinophthalone. Pigments are finely divided substances which are insoluble, in particular in the polyester material, and which are used to colour and/or opacify the material into which they are introduced. The main pigments used to colour and/or opacify the polyesters, in particular PET, are metal oxides, such as $TiO_2$, $CoAl_2O_4$ or $Fe_2O_3$, silicates, polysulfides and carbon black. The pigments are particles with a size generally of between 0.1 and 10 µm and predominantly between 0.4 and 0.8 µm. The complete removal of these pigments by filtration, which is necessary in order to envisage recycling the opaque PET, is technically difficult as they have an extremely high clogging capability. The recycling of coloured and opaque PETs is thus extremely problematic.

Patent application US 2006/0074136 describes a process for the depolymerization by glycolysis of coloured PET, in particular resulting from the recovery of green-coloured PET bottles. The feedstock treated by this process takes the form of PET flakes and is contacted with ethylene glycol in a reactor at a temperature between 180 and 280° C. for a number of hours. The product of glycolysis which is obtained at the conclusion of the depolymerization step is purified on activated carbon at a temperature of more than 170° C. and then by extraction of the residual dies, particularly the yellow dies, with a solvent, which may be an alcohol such as methanol, or a glycol such as ethylene glycol. The BHET, for its part, crystallizes in the extraction solvent and is then separated by filtration.

In patent application US 2015/0105532, the post-consumer PET, which comprises a mixture of different, coloured PETs, such as clear PET, blue PET, green PET and/or amber PET, in the form of flakes, is depolymerized by glycolysis in the presence of ethylene glycol and of an amine and alcohol catalyst, in a reactor at 150-250° C., in batch mode. The resulting diester monomer is purified by filtration, ion exchange and/or passage over activated carbon in particular at a temperature of 80-90° C., before being crystallized and recovered by filtration. U.S. Pat. No. 6,642,350 in turn describes the purification of a crude BHET solution, which comprises at least a succession of contacts between said solution and an activated carbon, an anion exchange resin and a cation exchange resin, in particular at a temperature of 60° C., 65° C. or 80° C. Indeed, this patent shows that a single contact with activated carbon alone is not enough to decolorize the solution, especially entirely, since a residual colour, more particularly yellow, is observed when said crude BHET solution is contacted solely with activated carbon.

Lastly, patent application FR 3053691 describes a process for depolymerizing a polyester feedstock comprising opaque PET and in particular from 0.1% to 10% by weight of pigments, by glycolysis in the presence of ethylene glycol. A purified bis(2-hydroxyethyl) terephthalate (BHET) effluent is obtained after particular steps of separation and of purification by adsorption. However, the BHET effluent obtained by the process described in patent application FR 3053691 may have imperfections: the BHET effluent obtained undergoes colouration, especially rapid colouration, despite being passed through a column of adsorbent.

The present invention has the goal of perfecting these processes for depolymerization by glycolysis of the polyester feedstock comprising coloured and/or opaque PET, and more particularly the process of patent application FR 3053691, especially in order to improve the purification, and more especially the decolourizing, of the diester effluent obtained after separation of the heavy and solid impurities, such as the oligomers and the pigments. The object of the invention, indeed, is to obtain a diester stream, more particularly a BHET stream, by depolymerization of a polyester feedstock comprising coloured and/or opaque PET, which has a high purity and in particular is colourless or virtually colourless.

SUMMARY OF THE INVENTION

An object of the invention is therefore a process for depolymerizing a polyester feedstock comprising opaque polyethylene terephthalate (PET), said process comprising:
a) a conditioning step comprising a conditioning section supplied at least with said polyester feedstock, to produce a conditioned stream;
b) a step of depolymerization by glycolysis, which is supplied at least with the conditioned stream and with a supplement of a diol so that the molar amount of diol is adjusted to between 1 to 20 moles of diol per mole of diester in said polyester feedstock, conducted at a temperature of between 180 and 400° C. and a residence time of between 0.1 and 10 h;
c) a diol separation step, which is supplied at least with the effluent from step b), and is conducted at a temperature of between 100 and 250° C., at a pressure less than that of step b), and which produces a diol effluent and a liquid effluent rich in monomers, wherein said diol separation step is implemented in one to five successive gas-liquid separation sections, each producing a gaseous effluent and a liquid effluent, wherein the liquid effluent from the preceding section supplies the subsequent section, the liquid effluent obtained from the last gas-liquid separation section forms the liquid effluent rich in monomers, and all the gaseous effluents are recovered to form the diol effluent;
d) a step of separation of the effluent rich in liquid monomers obtained from step c) into a heavy impurities effluent and a prepurified monomers effluent, which is conducted at a temperature of less than 250° C. and a pressure of less than 0.001 MPa, with a liquid residence time of less than 10 min, and
e) a step for decolourizing the prepurified monomers effluent, comprising at least one section for mixing the prepurified monomers effluent obtained in step d) with a solvent, so that the prepurified monomers effluent represents between 20% and 90% by weight of the total weight of the mixture, and an adsorption section conducted at a temperature of between 100 and 200° C. and at a pressure of between 0.1 and 1.0 MPa, in the presence of at least one adsorbent selected from activated carbons, alumina and clays, to obtain a purified monomers effluent.

One advantage of the present invention is that, starting from a polyester feedstock comprising at least PET, more particularly coloured and/or opaque PET, it produces a diester effluent, more particularly a BHET stream, which is purified, being more particularly colourless, or virtually colourless.

The invention is therefore of interest in that it is able to process any type of polyester waste, which is increasingly including pigments and dyes, such as coloured, opaque and even multilayer PETs. The process according to the invention is suitable for processing opaque PET, and allows the pigments and dyes to be removed and the diester monomer to be regained by chemical reaction. This monomer may then be repolymerized to give a polymer which exhibits no difference from a virgin polyester, more particularly a virgin PET, thus allowing all of the uses of virgin PET.

DESCRIPTION OF THE EMBODIMENTS

According to the invention, polyester terephthalate or poly(ethylene terephthalate), also simply called PET, has an basic repeat unit of formula:

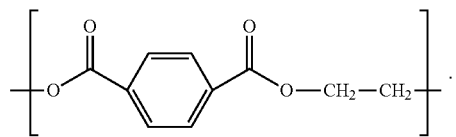

Conventionally, PET is obtained by polycondensation of terephthalic acid (PTA) or dimethyl terephthalate (DMT) with ethylene glycol. In the continuation of the text, the expression "per mole of diester in said polyester feedstock" corresponds to the number of moles of —[O—CO—$(C_6H_4)$—CO—O—$CH_2$—$CH_2$]— unit, which is the diester unit obtained from the reaction of PTA and ethylene glycol, in the PET included in said polyester feedstock.

According to the invention, the term "monomer" or "diester monomer" advantageously denotes bis(2-hydroxyethyl) terephthalate (BHET) of chemical formula HOC$_2$H$_4$—CO$_2$—(C$_6$H$_4$)—CO$_2$—C$_2$H$_4$OH, in which —(C$_6$H$_4$)— represents an aromatic ring, this being the diester unit obtained from the reaction of PTA and ethylene glycol, in the PET included in said polyester feedstock.

The term "oligomer" typically denotes a polymer of small size, consisting generally of 2 to 20 basic repeat units. According to the invention, the term "ester oligomer" or "BHET oligomer" denotes a terephthalate ester oligomer comprising between 2 and 20, preferably between 2 and 5, basic repeat units of formula —[O—CO—(C$_6$H$_4$)—CO—O—C$_2$H$_4$]—, where —(C$_6$H$_4$)— is an aromatic ring.

According to the invention, the terms "diol" and "glycol" are used without distinction and correspond to compounds comprising two —OH hydroxyl groups. The preferred diol is ethylene glycol, also referred to as monoethylene glycol or MEG.

The diol or diol effluent streams employed in the steps of the process of the invention therefore preferably comprise ethylene glycol (or MEG) in an amount of great majority, that is to say such that the MEG represents 95% by weight or more of the total weight of said diol or diol effluent stream.

The term "dye" is understood to mean a substance which is soluble in the polyester material and is used to colour it. The dye can be of natural or synthetic origin.

According to the invention, the term "pigment", more particularly opacifying and/or colouring pigment, defines a finely divided substance which is insoluble in particular in the polyester material. The pigments are in the form of solid particles with a size of generally between 0.1 and 10 µm, and predominantly between 0.4 and 0.8 µm. They are often of inorganic nature. The pigments generally used, notably for opacifying, are metal oxides, such as TiO$_2$, CoAl$_2$O$_4$ or Fe$_2$O$_3$, silicates, polysulfides and carbon black.

According to the present invention, the expressions "of between . . . and . . . " and "between . . . and . . . " mean that the limiting values of the interval are included in the range of values described. If such were not the case and if the limiting values were not included in the range described, such a clarification will be given by the present invention.

Particular and/or preferred embodiments of the invention may be described hereinafter. They may be implemented separately or combined with one another with no limitation on their combination insofar as such combination is technically feasible.

Feedstock

The process according to the invention is supplied with a polyester feedstock comprising at least one polyester, this being a polymer in which the repeat unit of the main chain contains an ester function, and comprising polyethylene terephthalate (PET), preferably comprising at least opaque PET, and advantageously coloured PET and more preferably opaque PET and coloured PET.

Said polyester feedstock is advantageously a polyester feedstock to be recycled, obtained from the divisions for collecting and sorting waste, more particularly plastic waste. Said polyester feedstock may originate, for example, from the collection of bottles, trays, films, resins and/or fibres consisting of polyethylene terephthalate.

The polyester feedstock advantageously comprises at least 50% by weight, preferably at least 70% by weight, more preferably at least 90% by weight of polyethylene terephthalate (PET). Said polyester feedstock preferably comprises at least one PET selected from opaque, dark or coloured and multilayer PET and mixtures thereof. Very particularly, said polyester feedstock comprises at least 10% by weight of opaque PET, very preferably at least 15% by weight of opaque PET, said opaque PET advantageously being opaque PET to be recycled, namely PET obtained from the divisions for collecting and sorting.

Said polyester feedstock advantageously comprises between 0.1% to 10% by weight of pigments, advantageously between 0.1% and 5% by weight. It also preferably comprises between 0.05% and 1% of dyes, in particular between 0.05 and 0.2% by weight.

In the divisions for collecting and sorting, the polyester wastes are washed and ground before forming the polyester feedstock of the process according to the invention.

The polyester feedstock may be wholly or partly in the form of flakes, having a maximum length of less than 10 cm, preferably of between 5 and 25 mm, or in a micronized solid form, namely in the form of particles preferably having a size of between 10 microns and 1 mm. The feedstock may further comprise "macroscopic" impurities, preferably less than 5% by weight, more preferably less than 3% by weight, of "macroscopic" impurities, such as glass, metal, plastics other than polyester (for example PP, HDPE, etc.), wood, paper, cardboard or inorganic elements. Said polyester feedstock may also be wholly or partly in the form of fibres, such as textile fibres, optionally pretreated in order to remove cotton or polyamide fibres or any other textile fibre other than polyester, or such as tyre fibres, optionally pretreated in order to remove, in particular, polyamide fibres or rubber or polybutadiene residues. Said polyester feedstock may further comprise polyester obtained from production scraps from processes of polymerization and/or conversion of the polyester material. The polyester feedstock may also comprise elements used as a polymerization catalyst and as stabilizers in PET production processes, such as antimony, titanium and tin.

Conditioning Step a)

Said process according to the invention comprises a conditioning step a), which comprises at least one conditioning section supplied at least with said polyester feedstock, and producing a conditioned stream.

Said conditioning section of step a) enables the heating and pressurization of said polyester feedstock to the operating conditions of the depolymerization step b).

In the conditioning section, the polyester feedstock is progressively heated to a temperature close to or even slightly about its melting point, so as to become at least partly liquid. Advantageously at least 70% by weight of the polyester feedback, very advantageously at least 80% by weight, preferably at least 90% by weight, more preferably at least 95% by weight of the polyester feedstock is in liquid form at the conclusion of the step a) conditioning section. The temperature at which the conditioning section of step a) is implemented is advantageously between 225 and 275° C. This temperature is kept as low as possible, to minimize the thermal degradation of the polyester.

According to one preferred embodiment of the invention, said conditioning section is an extrusion section, which corresponds to a screw conveying section. In other words, the conditioning section is operated in an extruder.

The residence time in said extrusion section, defined as the volume of said section divided by the volume flow rate of feedstock, is advantageously less than 15 min, preferably less than 10 min, and more preferably less than 2 min. The extrusion section advantageously allows conditioning of the polyester feedstock such that the conditioned stream is at a temperature of between 150-300° C., preferably between 225 and 275° C., and at a pressure between atmospheric pressure (i.e. 0.1 MPa) and 20 MPa.

Said extrusion section is advantageously connected to a vacuum extraction system so as to remove impurities, such as dissolved gases, light organic compounds and/or moisture present in the feedstock. Said extrusion section may also advantageously comprise a filtration system for removing solid particles with a size of greater than 40 μm, preferably with a size of less than 2 cm, such as sand particles.

According to one optional embodiment of the invention, the conditioning section may comprise a conditioning zone, employed advantageously at a temperature of between 225 and 275° C., preferably in an extruder, and then a feedstock-diol contact phase in which the polyester feedstock is advantageously contacted with a diol stream, preferably with a fraction of the diol effluent obtained from step c), preferably such that the number of moles of diol of said diol stream, preferably of said fraction of the diol effluent obtained from step c), per mole of diester in said polyester feedstock, is less than 1.0, preferably less than 0.5 and advantageously at least 0.05. The effect of this contacting is to initiate the depolymerization reaction of the polyester feedback, before its introduction into the depolymerization step b). It also enables the viscosity of the polyester feedstock to be reduced, therefore facilitating its transport particularly to the depolymerization step b). Said optional feedstock-diol contact phase may be implemented in a static or dynamic mixer. When the conditioning zone is implemented in an extruder, the feedstock-diol contact phase may be implemented within the extruder; in this case, it constitutes a reactive extrusion phase. Preferably, the diol stream, more particularly the fraction of the diol effluent obtained from step c), may advantageously be overheated prior to being supplied into the feedstock-diol contact phase, in order to make it easier to bring the polyester feedstock to temperature.

The polyester feedstock may also advantageously be mixed, before or in the conditioning section, with at least a fraction of the heavy impurities effluent obtained from step d), said fraction having preferentially been purified in advance.

The conditioned stream obtained from the conditioning section is advantageously sent to the depolymerization step b).

Depolymerization Stage b)

The process according to the invention comprises a step of depolymerization by glycolysis, which is supplied at least with the conditioned stream obtained from step a) and with a supplement of diol which is conducted, more particularly in liquid phase, advantageously at a temperature of between 180 and 400° C., preferably between 200 and 300° C., more preferably between 210° C. and 280° C., at a residence time in said step b) of between 0.1 and 10 h, preferably between 0.25 and 8 h, more preferably between 0.5 and 6 h, and so that the total amount of diol is adjusted to between 1 to 20 moles, preferably between 3 to 15 moles, more preferably between 5 to 10 moles of diol per mole of diester in said polyester feedstock (corresponding to a weight ratio of diol introduced, relative to the weight of the polyester feedstock, of between 0.3 and 6.7, preferably between 1.0 and 5.0, more preferably between 1.7 and 3.3).

The operating pressure of said step b) is determined so as to keep the reaction system in liquid phase. This pressure is advantageously at least 0.1 MPa, preferably at least 0.4 MPa. A "reaction system" refers to the collective components and phases present within said stage b). The residence time is defined as the ratio of the volume of liquid in said reaction section to the sum of the volume flow rate of the polyester feedstock and the supplement of diol. The diol is advantageously monoethylene glycol.

Said depolymerization step b) advantageously comprises one or more reaction sections, preferably at least two reaction sections, more preferably between two and four reaction sections, which operate in series. Each reaction section can be employed in any type of reactor known to a person skilled in the art which makes it possible to carry out a depolymerization or transesterification reaction, preferably in a reactor stirred by a mechanical stirring system and/or by a recirculation loop and/or by fluidization. Said reactor can comprise a conical bottom which makes it possible to bleed off the impurities. Said depolymerization step b) preferably comprises at least two reaction sections, more preferably between two and four reaction sections, which operate in series, wherein the reaction section(s), starting from the second reaction section, is or are operated at a mutually identical or different temperature which is lower than or equal to the temperature of the first reaction section, preferably lower, and more preferably lower than 10 to 50° C., or even lower than 20 to 40° C., relative to the temperature of the first operational section.

The glycolysis reaction can be carried out in the presence or absence of a catalyst. When the glycolysis reaction is carried out in the presence of a catalyst, the latter can be homogeneous or heterogeneous and chosen from the esterification catalysts known to a person skilled in the art, such as complexes, oxides and salts of antimony, tin or titanium, alkoxides of metals from Groups (I) and (IV) of the Periodic Table of the Elements, organic peroxides or acidic/basic metal oxides.

A preferred heterogeneous catalyst advantageously comprises at least 50% by mass, with respect to the total mass of the catalyst, preferably at least 70% by mass, advantageously at least 80% by mass, very advantageously at least 90% by mass, and more advantageously still at least 95% by mass, of a solid solution consisting of at least one spinel of formula $Z_xAl_2O_{(3+x)}$ in which x is between 0 (limit excluded) and 1, and Z is chosen from Co, Fe, Mg, Mn, Ti and Zn, and comprising at most 50% by mass of alumina and of oxide of the element Z. Said preferred heterogeneous catalyst advantageously contains at most 10% by mass of dopants chosen from silicon, phosphorus and boron, taken alone or as a mixture. For example, and without limitation, said solid solution can consist of a mixture of spinel $ZnAl_2O_4$ and of spinel $CoAl_2O_4$, or else consist of a mixture of spinel $ZnAl_2O_4$, of spinel $MgAl_2O_4$ and of spinel $FeAl_2O_4$, or else consist solely of spinel $ZnAl_2O_4$.

The particular embodiment in which said preferred heterogeneous catalyst is used has the advantage of outstanding conversion of the PET into BHET by glycolysis. Moreover, the heterogeneous catalyst of this particular embodiment has the surprising property of trapping the impurities, especially the dyes, the additives and the catalytic substances used for the polymerization and present in the PET processed in the process of the invention, such as antimony, magnesium, manganese, zinc, titanium, phosphorus, so simplifying the subsequent steps of purifying the BHET to allow it to be reused in a polymerization process. Said depolymerization step is preferably carried out without addition of external catalyst to the feedstock.

Said depolymerization step may advantageously be carried out in the presence of a solid adsorbing agent in powder or shaped form, the function of which is to trap at least part of the coloured impurities, thereby relieving the strain on the decolourizing step e). Said solid adsorbing agent is advantageously an activated carbon.

The glycolysis reaction allows the polyester feedstock to be converted into ester oligomers and monomers, and advantageously allows PET to be converted into monomer bis(2-hydroxyethyl) terephthalate (BHET) and oligomers of BHET. The conversion of the polyester feedstock in said depolymerization step is greater than 50%, preferably greater than 70%, in a preferred way greater than 85%. The molar BHET yield is greater than 50%, preferably greater than 70%, in a preferred way greater than 85%. The molar BHET yield corresponds to the molar flow rate of BHET at the outlet of said step b) to the number of moles of diester in the polyester feedstock supplying said step b).

An internal recirculation loop is advantageously employed in step b), that is to say the withdrawing of a fraction of the reaction system, the filtration of this fraction and the reinjection of said fraction into said step b). This internal loop enables the removal of the solid, "macroscopic" impurities possibly present in the reaction liquid.

The depolymerization step b) makes it possible, advantageously, to obtain a reaction effluent, which is sent to a diol separation step c).

Diol Separation Step c)

The process according to the invention comprises a diol separation step c), which is supplied at least with the effluent from step b), and which is operated at a temperature of between 100 and 250° C., at a pressure lower than that of step b), and which produces a diol effluent and a liquid effluent rich in monomers.

The primary function of step c) is to recover some or all of the unreacted diol.

Step c) is operated at a pressure lower than that of step b), so as to vaporize a fraction of the effluent from step b) to give a gaseous effluent and a liquid effluent. Said liquid effluent forms the effluent rich in liquid monomers. The gaseous effluent consisting of more than 50% by weight of diol, preferably more than 70% by weight, more preferably more than 90% by weight, forms a diol effluent.

Step c) is advantageously implemented in one of gas-liquid separation section or a succession of gas-liquid separation sections, advantageously from two to five successive separation sections, very advantageously from three to five successive separations. Each of the gas-liquid separation sections produces a liquid effluent and a gaseous effluent. The liquid effluent from the preceding section feeds the subsequent section. All the gaseous effluents are recovered to form the diol effluent. The liquid effluent resulting from the final gas/liquid separation section constitutes the liquid effluent rich in monomers.

Advantageously, at least one of the gas-liquid separation sections may be implemented in a falling-film evaporator or a thin-film evaporator or a short-path distillation.

Step c) is conducted in such a way that the temperature of the liquid effluents is kept above the value below which the polyester monomer precipitates, and below a high value, dependent on the molar diol/monomer ratio, above which the monomer significantly repolymerizes. The temperature in step c) is between 100 and 250° C., preferably between 110 and 220° C., more preferably between 120 and 210° C. Operating in a succession of gas-liquid separations, advantageously in a succession of 2 to 5, preferably of 3 to 5, successive separations is particularly advantageous since it allows the temperature of the liquid effluent to be adjusted in each separation, to meet the aforesaid constraints.

The pressure in step c) is adjusted to allow the diol to be evaporated at one temperature, while minimizing the repolymerization and enabling optimum energetic integration. It is generally between 0.00001 and 0.2 MPa, preferably between 0.00004 and 0.15 MPa, more preferably between 0.00004 and 0.1 MPa.

The separation section(s) is (are) advantageously stirred by any method known to a person skilled in the art.

The diol effluent may contain other compounds such as dyes, light alcohols, water and diethylene glycol. At least a fraction of the diol effluent may advantageously be recycled, in liquid form, i.e. after condensation, to step a) and/or step b) and/or step e), optionally as a mixture with a supplement of diol external to the process according to the invention.

Some or all of said diol effluent may be treated in a purification step prior to being recycled. This purification step may comprise, non-exhaustively, adsorption on a solid (for example activated carbon) to remove dyes, and one or more distillations to separate off the impurities such as diethylene glycol, water and other alcohols.

Monomer Separation Step d)

The process according to the invention comprises a step d) of separating the effluent rich in monomers obtained from step c) into a heavy impurities effluent and a prepurified monomers effluent.

Said step d) is advantageously conducted at a temperature of less than 250° C., preferably of less than 230° C., and very preferably of less than 200° C., and preferably of more than 110° C., and at a pressure of less than 0.001 MPa, preferably less than 0.0005 MPa, preferably greater than 0.000001 MPa, with a liquid residence time of less than 10 min, preferably less than 5 min, more preferably less than 1 min, and preferably more than 0.1 second.

The objective of this separation step d) is to separate the monomer, more particularly BHET, which is vaporized, from the oligomers not completely converted, which remain liquid and therefore also trap the heavy impurities, especially the pigments, from the unconverted polyester polymer, from other polymers possibly present, and from the polymerization catalysts, minimizing the loss of monomers by repolymerization. Some oligomers may optionally be entrained with the monomer, especially those having a small size. These heavy impurities are found with the oligomers in the heavy impurities effluent.

Owing to the possible presence in the polyester feedstock of polymerization catalysts, the separation must be carried out with very short liquid residence times and at a temperature of not more than 250° C., so as to limit any risk of repolymerization of the monomer during this step. A separation by simple atmospheric distillation cannot, therefore, be contemplated.

The separation step d) is advantageously implemented in a separation section comprising a falling-film or thin-film evaporation system or an evaporation system involving short-path distillation with a falling film or with a thin film, more particularly by short-path distillation with a falling film or with a thin film.

A very low operating pressure is necessary in order to allow step d) to be operated at a temperature of less than 250° C., preferably less than 230° C., while allowing the monomer to vaporize.

A polymerization inhibitor may advantageously be mixed with the liquid effluent rich in monomers before being used to supply said step d).

A flux may also advantageously be mixed with the liquid effluent rich in monomers before being used to supply said step b), so as to facilitate the removal of the heavy impurities, especially the pigments, at the bottom of the short-path distillation or evaporation system. This flux is required to have a much higher boiling point than the monomer, more particularly than BHET, under the operating conditions of step d). It can, for example, be polyethylene glycol, or PET oligomers.

Said heavy impurities effluent comprises, in particular, the pigments, oligomers and optionally unseparated BHET. Said heavy impurities effluent is advantageously recycled, in whole or in part, to the conditioning step a). Said heavy impurities effluent may advantageously undergo at least one purification step, preferably a filtration step, prior to its recycling, so to reduce the amount of pigments and/or other solid impurities. The portion of said separated heavy impurities effluent, having a high pigment content, may advantageously be purged from the process and sent to an incineration system.

Said prepurified monomers effluent, obtained from the separation section of step d), is advantageously sent to step e).

Said prepurified monomers effluent obtained from the separating section of step d) may optionally be sent into a gas/liquid separation section, operated in any equipment known to a person skilled in the art, at a temperature of between 100 and 250° C., preferably between 110 and 200° C., and more preferably between 120 and 180° C., and at a pressure of between 0.00001 and 0.1 MPa, preferably between 0.00001 and 0.01 MPa, and more preferably between 0.00001 and 0.001 MPa. Said optional gas-liquid separation section enables the separation of a gaseous diol effluent and a liquid prepurified monomer effluent. Said gas-liquid separation enables a further reduction in the amount of diol remaining in the prepurified monomers effluent, or even the removal of the residual diol, by recovering, from said gaseous diol effluent, more than 50% by wt, preferably more than 70% by wt, more preferably more than 90% by wt of the diol possibly entrained in step d) with the prepurified monomers effluent. The amount of monomer entrained in said gaseous diol effluent is preferably less than 1% by wt, more preferably less than 0.1% by wt and more preferably still less than 0.01% by wt, of the amount of monomer present in the prepurified monomer effluent. Said gaseous diol effluent is subsequently advantageously condensed, optionally pretreated in a purification step and recycled with the diol effluent obtained from step c) to step a) and/or to step b) and/or as a mixture in step e). Where the process comprises this gas-liquid separation section, the stream which is sent to step e) is the liquid prepurified monomers effluent obtained at the conclusion of said optional gas-liquid section.

Decolourizing Stage e)

The process according to the invention comprises a step of decolourizing the prepurified monomers effluent obtained from step d), or optionally the liquid prepurified monomer effluent, to produce a purified monomers effluent.

Said step e) advantageously enables the removal of the residual dyes from the prepurified monomers effluent, more particularly the dyes whose boiling point is less than the cut-off point, namely under the temperature and pressure conditions employed in particular in the monomer separation step d). The reason is that the latter, entrained with the prepurified monomers effluent which they colour, can thus be removed effectively by adsorption in said step e).

Said step e) advantageously employs at least a section for mixing the prepurified monomers effluent obtained from step d), or optionally the liquid prepurified monomer effluent, with a solvent, and an adsorption section.

Said mixing section is supplied at least with the prepurified liquid monomers effluent obtained from step d), or optionally the liquid prepurified monomer effluent, and a solvent, preferably selected from the diols, for example ethylene glycol.

Said solvent comprises, preferably consists of, a fraction of the diol effluent obtained from step c), a supplement of diol external to the process according to the invention, or mixtures thereof. In a very advantageous manner, said solvent is a fraction of the diol effluent obtained from step c).

The amount of solvent introduced into the mixing section is preferably adjusted such that the prepurified monomers effluent, or optionally the liquid prepurified monomer effluent, represents between 20% and 90% by weight, preferably between 30% and 80% by weight, more preferably between 50% and 75% by weight, of the total weight of the mixture of said mixing section. Said mixing section is advantageously operated at a temperature of between 100 and 250° C., preferably between 110 and 200° C., and more preferably between 120 and 180° C., and at a pressure of between 0.1 and 1.0 MPa, preferably between 0.1 and 0.8 MPa, and more preferably between 0.2 and 0.5 MPa. The solvent may be heated, prior to said optional mixing section, preferably to the temperature at which the mixing section is operated, in particular at a temperature of between 100° C. and 250° C., preferably between 110° C. and 200° C., and more preferably between 120° C. and 180° C.

The mixing section preferably employs a static or dynamic mixer, preferably a static mixer. The residence time in the mixing section, defined as the total liquid volume in said mixing section relative to the flow rate of liquid mixture leaving said mixing section, is advantageously between 0.5 second and 20 minutes, preferably between 1 second and 5 minutes, more preferably between 3 seconds and 1 minute.

Said mixture from the mixing section advantageously supplies the adsorption section. The adsorption section is operated in the presence of at least one adsorbent, and preferably of up to five different adsorbents, at a temperature of between 100 and 200° C., preferably between 100 and 170° C., and more preferably between 120 and 150° C., and preferentially at a pressure of between 0.1 and 1.0 MPa, more particularly between 0.1 and 0.8 MPa and very particularly between 0.2 and 0.5 MPa.

The adsorption section advantageously comprises at least one adsorber. Very advantageously, the residence time of the mixture in each adsorber of the adsorption section is between 20 minutes and 40 hours, preferably between 1 hour and 30 hours, more preferably between 1 hour and 20 hours. The residence time is defined as the ratio of the internal volume of the adsorber to the volume flow rate of the mixture obtained from the mixing section.

The adsorption section is preferably operated in the presence of one adsorbent or two different adsorbents. According to the invention, adsorbents are said to be different when their nature is different and/or their composition and/or their different particle size and/or their textural characteristics, such as the pore volume. More preferably, different adsorbents are different in nature.

When the adsorption section comprises two or more different adsorbents, said different adsorbents are in a mixture or are placed in series in said adsorption section, preferably in series, and more preferably each of the adsorbents is in different adsorbers (for example reactors or columns) placed in series. The reason is that it may be advantageous to combine two or more different adsorbents, more particularly differing in nature, in order to optimize the removal of the residual dyes, which may themselves be very different in nature. Indeed, since the polyester feedstock of the process is obtained from polyester wastes, such as PET packaging wastes or plastic bottles, it may comprise a very large number of coloured and/or opaque PETs and therefore a very large number of different dye compounds. The colouration of the effluent obtained from step d) may also originate from degradation or transformation of compounds forming the feedstock in the course of conditioning a), polymerization b), diol separation c) and monomer separation d) steps.

Said adsorbent(s) is (are) advantageously selected from activated carbons, aluminas and clays. The activated carbons that can be used are obtained, for example, from petcoke, from coal, or from any other fossil origin, or obtained from biomass such as wood, coconut or any other source of biomass. Different starting materials may also be mixed in order to produce activated carbons which may possibly be used as adsorbents in said adsorption section. The clays may be, for example, layered double hydroxides or natural or converted clays such as those known to a person skilled in the art as decolourizing earths. Preferably, at least one adsorbent is an activated carbon. Therefore, when the adsorption section comprises a single type of adsorbent, said adsorbent is an activated carbon and, when the adsorption section comprises two or more different adsorbents, one adsorbent is an activated carbon and the other(s) is (are) another activated carbon, an alumina or a clay, preferably an activated carbon or a clay, more particularly a clay.

The adsorption section is advantageously implemented in flow-through fixed-bed mode, namely in at least one adsorber with a fixed bed adsorbent(s), more particularly at least one column of adsorbent(s), which may operate in upflow or downflow mode, preferably in upflow mode or in at least one continuous stirred reactor, also called a "continuous stirring tank reactor" (CSTR). Where the section is implemented in at least one CSTR stirred reactor, the reactor(s) is (are) followed by a filtration system for recovering said adsorbent(s) which is (are) in suspension in the liquid process. Preferably, the adsorption section is implemented in flow-through fixed-bed mode.

Preferably, each adsorbent of the adsorption section has a pore volume (Vp), determined by mercury porosimetry, of greater than or equal to 0.25 ml/g, preferably greater than or equal to 0.40 ml/g, more preferably greater than or equal to 0.50 ml/g, and preferably less than or equal to 5 ml/g.

Where the adsorption section comprises at least two different adsorbents, the adsorbents may:
either all be present in each column of said adsorption section, in a mixture or in successive beds;
or each be used in one adsorption subsection, the adsorption subsections being placed in series with one another, and each adsorption section consisting of two or more, preferably between two and four, fixed-bed adsorbent columns.

Very advantageously, said adsorption section or each of the subsections of said adsorption section comprises two or more fixed-bed adsorbent columns, more particularly at least two adsorbent columns, preferably between two and four columns of the same adsorbent, more particularly two columns of the same adsorbent. When the adsorption section or the adsorption subsection comprises two columns of the same adsorbent, one operating mode may be that referred to as "swing", in which one of the columns is on-line while the other column is in reserve. When the adsorbent in the on-line column is spent, this column is isolated, while the column in reserve is placed on-line. The spent adsorbent may then be regenerated in situ and/or replaced with fresh adsorbent, to be replaced on-line again when the other column has been isolated. Another mode for operating the adsorbent columns is to have at least two columns operating in series; when the adsorbent of the lead column (that is, the first column in the series) is spent, this first column is isolated and the spent adsorbent is either regenerated in situ or replaced with fresh adsorbent. The column is then replaced on-line in the last position in the column series, and so on. This operation is referred to as "lead-lag". Very preferably, the adsorption section is implemented in at least two columns of the same adsorbent, preferably in two to four columns of the same adsorbent, more preferably in two columns of the same adsorbent, operating in "lead-lag".

In one very particular embodiment of the invention, in which the adsorption section comprises two different adsorbents, the adsorption section very preferably comprises a first subsection comprising at least two, preferably between two and four, fixed-bed columns of activated carbon operating preferably in swing or in lead-lag, and a second subsection comprising at least two, preferably between two and four, columns of another adsorbent, preferably selected from another activated carbon or clay, operating in swing or in lead-lag and situated upstream or downstream of the first subsection of fixed-bed activated carbon columns.

The combination of at least two columns of the same adsorbent makes it possible to compensate in particular for possibly rapid clogging-up of the adsorbent, owing in particular to the presence of dyes in the pretreated monomers effluent. Indeed, the presence of at least two columns of adsorbent facilitates the replacement and/or regeneration of the adsorbent, advantageously without halting the decolourizing unit or even the process, so making it possible to reduce the risks of clogging and hence prevent the unit being halted because of the clogging up, to manage costs and to limit the consumption of adsorbent, while providing for continuous production of the purified diester monomers. This combination of at least two columns of at least the same adsorbent, operating in particular in "lead-lag", also makes it possible to maximize the adsorption capacity of said adsorbent.

Preferably, each adsorbent is in the form of granules, extrudates or powder. Preferably, each adsorbent is in the form of granules or extrudates when the adsorption section is implemented in flow-through fixed bed mode, and is in powder form when the adsorption section is implemented in a CSTR stirred reactor. The size of said at least one adsorbent, more particularly when it is in the form of granules or extrudates, is such that the smallest dimension of said at least one adsorbent (corresponding to the diameter of the circumscribed circle on the basis of granules or polylobate extradites, or to the diameter of the circumscribed cylinder on the cylindrical basis of extrudates of cylindrical type; this dimension is also referred to as "diameter") is preferably of between 0.1 and 5 mm, more preferably between 0.3 and 2 mm. For example, the activated carbon extrudates with a diameter of 0.8 mm which are sold by Cabot Norit, or the granules in the size range between 0.4 and 1.7 mm that are sold by Chemviron, may be suitable adsorbents in the adsorption section of the decolourizing step e).

The decolourizing step e) may also advantageously comprise a phase of regeneration of said adsorbent(s).

The purified monomers effluent obtained from step e) of the process of the invention is virtually colourless, or even colourless, to the eye. Preferably, therefore, the purified monomers effluent is characterized by UV-visible spectrometry in order to identify the presence of adsorption bands in the visible range, in other words between 400 and 800 nm. Preferably, the purified monomers effluent is characterized according to this method, in other words by UV-visible spectrometry between 400 and 800 nm, at a temperature greater than the melting point of the effluent characterized, in other words in liquid medium, i.e. preferably between 120° C. and 150° C. and with an optical path of 5 mm. The purified monomers effluent obtained according to the invention exhibits a spectrum in which there is no significant absorption band (i.e. no band which can be differentiated from the background noise) within the visible wavelength range (i.e. between 400 and 800 nm).

The purified monomers effluent advantageously supplies a polymerization step known to a person skilled in the art, for the purpose of producing PET which is entirely undistinguishable from virgin PET, advantageously downstream of the ethylene glycol, terephthalic acid or dimethyl terephthalate feed, depending on the polymerization step employed. Supplying the purified monomer effluent in a polymerization step makes it possible to reduce, by an equivalent flow rate, the supply of dimethyl terephthalate or of terephthalic acid.

The examples which follow illustrate the invention without limiting its scope.

EXAMPLES

In the example below, the conditioning a), depolymerization b), diol separation c) and monomer separation d) steps are identical and are described below.

A polyester feedstock comprising, in particular, 20% by weight of opaque PET is obtained from the collection and sorting divisions, to be processed. 4 kg/h of flakes of said polyester feedstock comprising 20% by weight of opaque PET, in turn containing 6.2% by weight of $TiO_2$ pigment, and 11.5 kg/h of ethylene glycol (MEG), are brought to a temperature of 250° C., injected into a first stirred reactor which is maintained at 250° C., and then into a second and a third stirred reactor, which are maintained at 220° C. The reactors are maintained at a pressure of 0.4 MPa. The residence time, defined as the ratio of the liquid volume in the reactor to the sum of the liquid volume flow rates entering the reactor, is set at 20 min in the first reactor and 2.1 h in the second and third reactors. At the exit from the third reactor, the reaction effluent consists of 67.7% by weight of diol composed very much in the majority of MEG (comprising 95% by weight or more of MEG), 25.8% by weight of diester monomer, composed very much in the majority of BHET (comprising 95% by weight or more of BHET), 0.32% by weight of $TiO_2$, and 6.1% by weight of heavy compounds including dimers and/or oligomers of BHET.

The ethylene glycol present in the reaction effluent is separated by evaporation in a succession of two flash vessels at temperatures of from 180° C. to 120° C. and pressures of 0.04 MPa to 0.004 MPa, and of a thin-film evaporator operated at 175° C. and 0.0005 MPa. At the conclusion of this evaporation step, an MEG-rich stream of 10.46 kg/h and a BHET-rich liquid stream of 5.02 kg/h are recovered. The MEG-rich stream consists very much in the majority of ethylene glycol and can thus on the one hand be recycled to the depolymerization reactor and can on the other hand be sent to the decolourizing step if necessary or to a purification step prior to the decolourizing step. The BHET-rich liquid stream consists of 79.6% by weight of diester monomer, 0.6% by weight of MEG and 1.0% by weight of $TiO_2$ and 18.8% by weight of heavy compounds including dimers of BHET.

The BHET-rich liquid stream is then injected to a short-path evaporator, also referred to as short-path distillation, which is operated at a pressure of 20 Pa. A hot oil at 215° C. enables the evaporation of the BHET, which is subsequently condensed in the short-path evaporator at 130° C. to give a liquid stream of prepurified BHET. The residence time in the short-path evaporator is 1 min. The liquid stream of prepurified BHET represents a flow rate of 3.8 kg/h and is recovered as distillate from the short-path evaporator. It consists of 99% by weight of diester monomer and is devoid of any trace of $TiO_2$. A heavy residue with a flow rate of 1.19 kg/h is recovered as a residue from the short-evaporator and consists of 16.7% by weight of diester monomer, 79.2% by weight of BHET oligomers and 4.1% by weight of $TiO_2$. The gaseous effluent is condensed at 130° C. to give a liquid stream of prepurified BHET.

Example 1—In Accordance

The liquid stream of prepurified BHET, containing 99% by weight of BHET diester, is compressed to 0.15 MPa and supplied to a mixing section which is also supplied with a fraction of the MEG stream from the vaporization step. The rate at which said fraction of the MEG stream is supplied is adjusted so that said liquid BHET stream represents 50% by weight of the final mixture. Said section is operated at 150° C., at a pressure of 0.15 MPa.

The resulting mixture is then supplied to an adsorption section consisting of two columns each filled with an adsorbent. The adsorption section is operated at 150° C., at a pressure of 0.15 MPa. One column is placed on-stream, the other remaining in reserve. The adsorbent used to fill the two columns is an activated carbon consisting of cylindrical extrudates 0.8 mm in diameter, referenced ROY 0.8 from Cabot Norit.

The residence time is set at 3 h.

The colouration of the effluent leaving the column is monitored in situ by UV-visible spectrometry, using a Hellma Falcata-series UV-visible probe with an optical path length of 5 mm. The colouration is monitored between 400 and 800 nm, via the appearance of a significant absorption band in this wavelength range.

The appearance of a colouration, identified via the appearance of an absorption band around 450 nm, is observed after 7 days. This time defines the operating life of the column before switching the stream to be treated to the column in reserve.

The column containing the spent adsorbent is either unloaded or regenerated before being placed back in operation on-stream when the column in reserve is spent.

The invention claimed is:

1. A process for depolymerizing a polyester feedstock comprising opaque polyethylene terephthalate (PET), said process comprising:
   a) a conditioning step comprising a conditioning section supplied at least with said polyester feedstock, to produce a conditioned stream;
   b) a step of depolymerization by glycolysis, which is supplied at least with the conditioned stream and with a supplement of diol so that the molar amount of diol is adjusted to between 1 to 20 moles of diol per mole of diester in said polyester feedstock, conducted at a temperature of between 18° and 400° C. and for a residence time of between 0.1 and 10 h;
   c) a diol separation step, which is supplied at least with the effluent from step b), and is conducted at a temperature of between 10° and 250° C., at a pressure less than that of step b), and which produces a diol effluent and a liquid effluent rich in monomers, wherein said diol separation step is implemented in two to five successive gas-liquid separation sections, each producing a gaseous effluent and a liquid effluent, wherein the liquid effluent from the preceding section supplies the subsequent section, a liquid effluent obtained from a last gas-liquid separation section forms the liquid effluent rich in monomers, and all the gaseous effluents are recovered to form the diol effluent;

d) a step of separation of the liquid effluent rich in monomers obtained from step c) into a heavy impurities effluent and a prepurified monomers effluent, which is conducted at a temperature of less than 250° C. and a pressure of less than 0.001 MPa with a liquid residence time of less than 10 min, and e) a step for decolorizing the prepurified monomers effluent, comprising at least a mixing section for mixing the prepurified monomers effluent obtained in step d) with a solvent to form a mixture wherein the prepurified monomers effluent represents between 20% and 90% by weight of the total weight of the mixture, and an adsorption section conducted at a temperature of between 10° and 200° C. and at a pressure of between 0.1 and 1.0 MPa in the presence of at least one adsorbent selected from activated carbons, alumina and clays, to obtain a purified monomers effluent.

2. The process according to claim 1, wherein said polyester feedstock comprises at least 50% by weight of polyethylene terephthalate.

3. The process according to claim 1, wherein said polyester feedstock comprises at least 10% by weight of opaque PET.

4. The process according to claim 1, wherein said polyester feedstock comprises colored PET.

5. The process according to claim 1, wherein said polyester feedstock comprises between 0.1% and 10% by weight of pigments.

6. The process according to claim 1, wherein said polyester feedstock comprises between 0.05% and 1% by weight of dyes.

7. The process according to claim 1, wherein the solvent in decolorizing step e) comprises a fraction of the diol effluent obtained from step c), a supplement of diol external to the process, or mixtures thereof.

8. The process according to claim 1, wherein the prepurified monomers effluent represents between 30% and 80% by weight of the total weight of the mixture in step e).

9. The process according to claim 1, wherein at least one adsorbent in step e) is an activated carbon.

10. The process according to claim 1, wherein the adsorption section in step e) is operated in the presence of an adsorbent or two different adsorbents.

11. The process according to claim 1, wherein the adsorption section comprises two or more different adsorbents, said different adsorbents being in a mixture or placed in series in said adsorption section.

12. The process according to claim 11, wherein each of said different adsorbents are in different reactors placed in series.

13. The process according to claim 1, wherein the adsorption section of step e) is implemented in fixed bed adsorption mode.

14. The process according to claim 1, wherein the adsorption section of step e) is operated at a temperature of between 10° and 170° C.

15. The process according to claim 1, wherein said polyester feedstock comprises at least 70% by weight of polyethylene terephthalate.

16. The process according to claim 1, wherein said polyester feedstock comprises at least 90% by weight of polyethylene terephthalate.

17. The process according to claim 1, wherein said polyester feedstock comprises at least 15% by weight of opaque PET.

18. The process according to claim 1, wherein said polyester feedstock comprises between 0.1% and 5% by weight of pigments.

19. The process according to claim 1, wherein the prepurified monomers effluent represents between 50% and 75% by weight, of the total weight of the mixture in step e).

20. The process according to claim 1, wherein the adsorption section of step e) is operated at a temperature of between 120° C. and 150° C.

21. The process according to claim 1, wherein said polyester feedstock comprises 0.05% and 0.2% by weight of dyes.

22. Process according to claim 1, wherein the mixing section employs a static or dynamic mixer, and the residence time of the mixture in the mixing section is between 0.5 second and 20 minutes.

23. Process according to claim 22, wherein the mixture from the mixing section supplies the adsorption section which contains at least one adsorber, wherein the adsorption section is operated at a temperature of between 10° and 200° C. and a pressure of between 0.1 and 1.0 MPa, and the residence time of the mixture in each adsorber of the adsorption section is between 20 minutes and 40 hours.

* * * * *